United States Patent [19]

Murakami

[11] Patent Number: 5,462,630
[45] Date of Patent: Oct. 31, 1995

[54] APPARATUS FOR PRODUCING PRECURED RETREADED TIRE

[75] Inventor: Tomoyuki Murakami, Innoshima, Japan

[73] Assignee: Innoshimaseiki Co., Ltd., Innoshima, Japan

[21] Appl. No.: 196,107

[22] PCT Filed: Aug. 24, 1992

[86] PCT No.: PCT/JP92/01084

§ 371 Date: Feb. 23, 1994

§ 102(e) Date: Feb. 23, 1994

[30] Foreign Application Priority Data

Aug. 27, 1991 [JP] Japan .................................. 3-298557

[51] Int. Cl.⁶ .................................................. B29D 30/56
[52] U.S. Cl. .................... 156/421.2; 156/96; 156/275.5; 156/909; 425/17; 425/25; 425/38; 425/39; 425/41; 425/48
[58] Field of Search .................... 156/96, 128.1, 156/394.1, 909, 275.5, 421.2; 425/17, 22, 23, 24, 25, 38, 41, 40, 39, 43, 48

[56] References Cited

U.S. PATENT DOCUMENTS

| | | | |
|---|---|---|---|
| 3,054,141 | 9/1962 | Hammesfamr | 425/41 |
| 3,597,797 | 8/1971 | Delille | 425/40 |
| 3,779,833 | 12/1973 | Reppel | 425/43 |
| 3,935,045 | 1/1976 | Wolfe | 156/96 |
| 4,011,125 | 3/1977 | Pelletier | 156/96 |
| 4,022,554 | 5/1977 | MacMillan | 425/25 |
| 5,026,515 | 6/1991 | Hasegawa et al. | 425/48 |

FOREIGN PATENT DOCUMENTS

| | | |
|---|---|---|
| 17483 | 2/1974 | Japan . |
| 38586 | 3/1977 | Japan . |
| 160625 | 10/1982 | Japan . |
| 212133 | 8/1990 | Japan . |
| 307739 | 12/1990 | Japan . |
| 812107 | 4/1959 | United Kingdom ............ 425/41 |
| 874529 | 8/1961 | United Kingdom ............ 425/40 |

*Primary Examiner*—Geoffrey L. Knable
*Attorney, Agent, or Firm*—Lane, Aitken & McCann

[57] ABSTRACT

The present invention relates to a method of producing a precured retreaded tire, etc., and the purpose of the invention is to produce the tire with saving space and power. Here, a precured retreated tire means a tire made by linking a plate rubber member, which has been vulcanized and molded so as to form tire grooves in advance, to a circumferential surface of a buffed abraded tire without vulcanizing said plate rubber member. A producing method according to the present invention comprises a step to insert a bladder (30) into a tire (T), a step to closely connect a plate of once vulcanized rubber member (T1) to a circumferential face of a buffed tire with an unvulcanized linking rubber (R) placed therebetween by attaching an envelope (48) to an outer circumferential face of the tire with fluid pressure, and a step to vulcanize the linking rubber by a heating device (46) and integrally combine the plate rubber member to the circumferential face of the tire, in order.

2 Claims, 12 Drawing Sheets

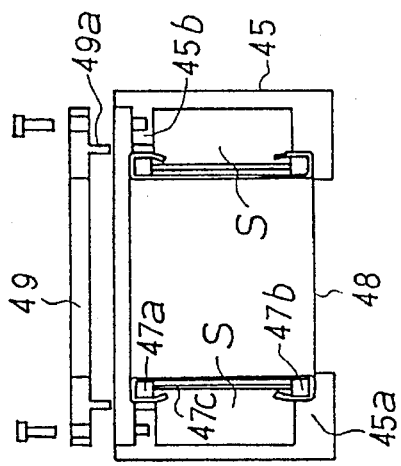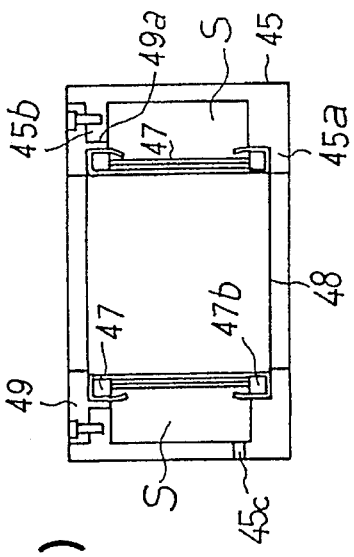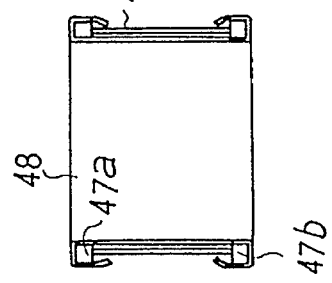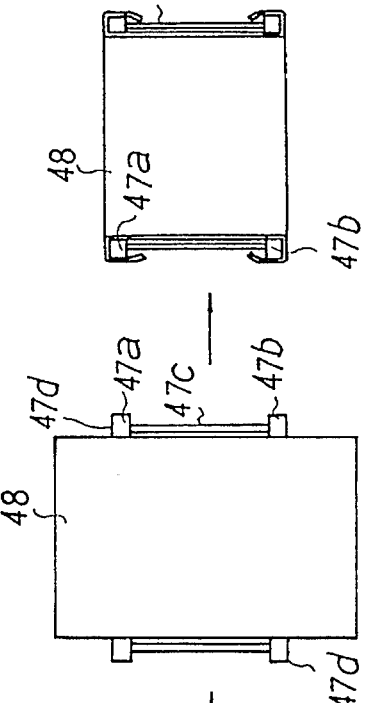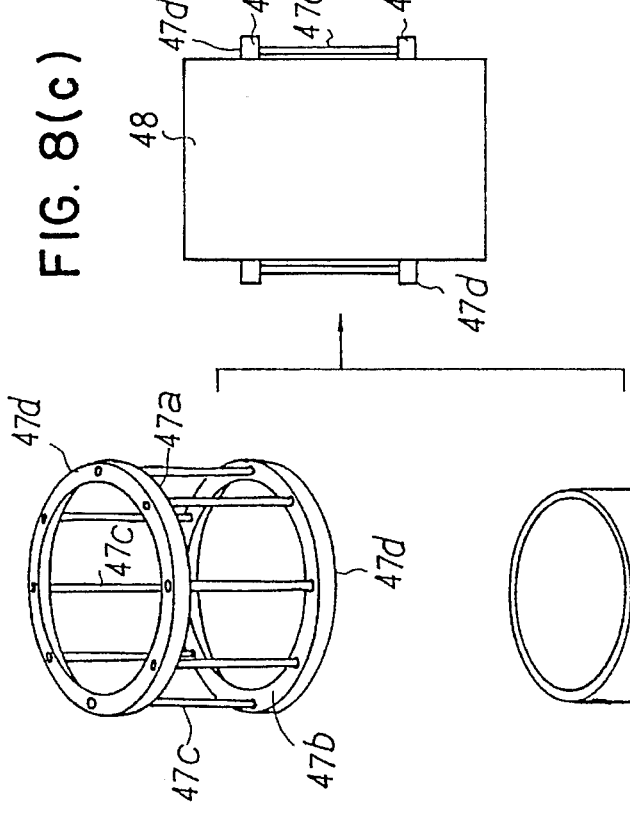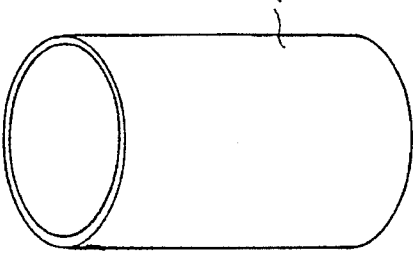

APPARATUS FOR PRODUCING PRECURED RETREADED TIRE

FIELD OF THE INVENTION

The present invention relates to a method of producing a precured retreaded tire and an apparatus therefor. Here, a precured retreaded tire means a tire made by binding a plate rubber member, which has been vulcanized and molded so as to form tire grooves in advance, to a circumferential surface of a buffed abraded tire without vulcanizing said plate rubber member.

BACKGROUND OF THE INVENTION

In a conventional method of producing a precured retreaded tire, first as shown in FIG. 11, a belt plate of rubber member T1, which has been vulcanized and molded so as to form tire grooves "d" in advance, is closely rolled onto a circumferential surface of a buffed abraded tire T with a thin plate of unvulcanized rubber R whose width is approximately 1 mm placed therebetween for linkage. Next, as shown in FIG. 12, an internal pressure tube 1 is put inside the tire T, a sectionally U-shaped ring envelope 2 made of thin rubber is bound to cover the circumferential and side faces of the tire T, and divided rims consisting of a female rim 3 and a male rim 3' are imposed thereon. Said female rim 3 consists of a support tube 3a and a ring plate 3b, and said male rim 3' consists of an insert tube 3c and a ring plate 3d. After preparing plural numbers of tire sets T' in the above condition, as shown in FIG. 13, those tire sets T' are hung onto a supporting beam 4a of a hanging stand 4 with the tire sets T' closely connected with each other by means of suitable clamps. Next, the hanging stand 4 is put inside a pressure type heating tank 5. At the same time, by supplying air of about 8 kg/cm$^2$ to said internal pressure tube through a supply port 1a. . . as well as sucking air from an exhaust port 2a . . . of said envelope 2, a vacuum is produced therein so that the plate rubber member T1 is closely attached to the circumferential surface of the tire T. After closing a cover 5a of the heating tank 5, steam at about 100° C. is supplied therein and circulated by a fan, etc. Here, the internal pressure is about 6 kg/cm$^2$. This state is kept for about four hours, and through this a thin plate of linking rubber R is thouroughly vulcanized. Accordingly, the plate of previously vulcanized rubber T1 is integrally combined with the circumferential surface of the tire T so as to finish a retreaded tire.

In the above-mentioned conventional producing method, because a huge heating tank and a boiler for producing steam for said tank, etc., are used, a wide space is necessary for installing them. Besides, there is such a disadvantage that a rubber member is damaged and abraded because of its direct contact with steam. Furthermore, operations such as inserting the internal pressure tube into the tire T, covering the outer surface of the tire T with the envelope 2, installing both the rim members 3 and 3' to the tire T, inserting the tire sets T' in the heating tank 5, etc. are actually manually conducted, and therefore rationalization of the operations is required. The object of the present invention is to solve these problems.

SUMMARY OF THE INVENTION

The present invention comprises a step to insert a bladder (an internal pressure tube) into a tire, a step to closely connect a plate of a previously vulcanized rubber to a circumferential face of a buffed tire with an unvulcanized linking rubber placed therebetween by attaching an envelope made of elastic and deformable rubber sleeve to the outer circumferential face of the tire with fluid pressure, and a step to vulcanize the linking rubber by a heating device and integrally combine the plate rubber member to the circumferential face of the tire. In this case, it is preferable to use a far infrared heating device as a heating device.

In this invention, a boiler is not necessary because precured retreaded tires are mechanically continuously produced. Besides, it settles a conventional problem that an envelope, etc. is worn because of direct contact with steam.

A device for the above-mentioned invention is characterized by that a tire loader device for continuously providing a tire, a lower ring device for placing a tire thereon by said tire loader device, and a lower rack having form members which contact with a lower side of the tire are provided, that an upper rack having an upper ring device for pushing the tire placed on said lower ring device, form members which contact with an upper side of the tire, and a heating furnace device for covering the outside of the tire is provided to the movable in upward and downward directions, that said heating furnace device comprises a jacket for covering a circumference of the tire, a far infrared heating device provided along an inner circumferential face of the jacket, and an envelope made of an elastic and defomable rubber sleeve provided inside the heating device, that a bladder of the lower ring device is inserted into the tire by a related operation of the lower and upper ring devices, that the envelope is attached to a required position on an outer surface of the tire with fluid such as air, and that a linking rubber for the tire is vulcanized by the far infrared heating device. According to this device, it is possible to further compact a whole device besides to provide the above-mentioned advantages.

The envelope of the above heating furnace device is put in a cylindrical cage fitted inside the jacket, and both ends thereof are folded to the outside at each edge of the cage. The envelope can be pressed and sealed to liner rings and/or the jacket for preventing the cage from getting out so as to be fixed there. The fixed envelope can be suitably elastically deformed by fluid pressure (such as air) supplied to a space between the envelope and the jacket, and it can be changed and installed easily.

According to the above invention, operations such as manually installing an inner pressure tube or an envelope, inserting conventional tire sets into a heating tank, etc. are not necessary at all. Since precured retreaded tires can be mechanically and automatically produced, manual operations are greatly reduced, thereby reducing personal expenses and labor in a great measure. Besides, because a big heating tank, etc. is not necessary, an installing space for the device becomes relatively small.

Especially if a far infrared heater is used as a heating device, a boiler also becomes unnecessary, and therefore the device can be further compacted.

BRIEF DESCRIPTION OF THE DRAWINGS

FIGS. 8(a)–8(f) is an explanatory view to show a forming step of a heating device according to the present invention.

PREFERRED EMBODIMENTS OF THE PRESENT INVENTION

Figure 1:
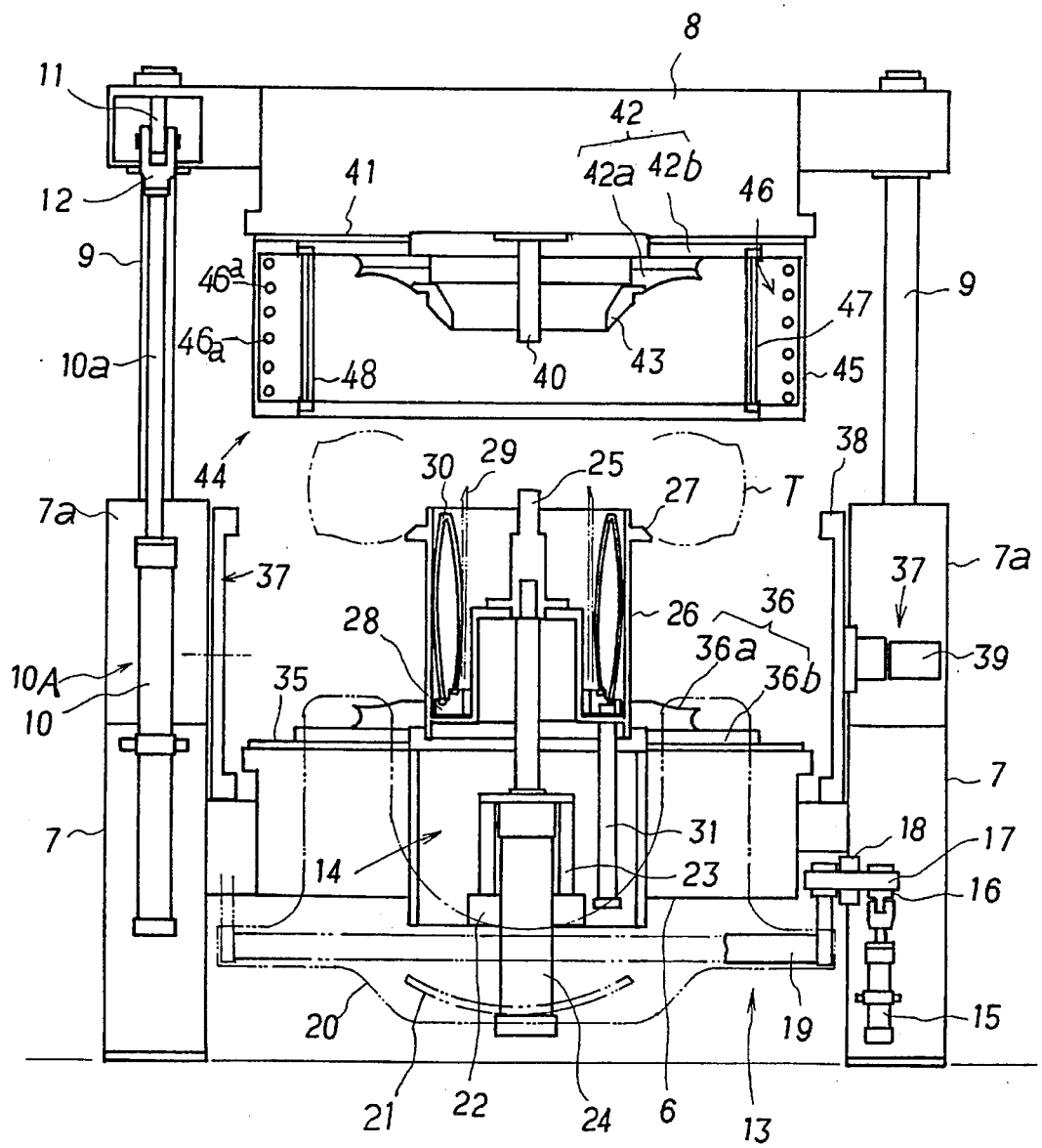
FIG. 1 is a front view of a device according to the present invention.
Figure 2:
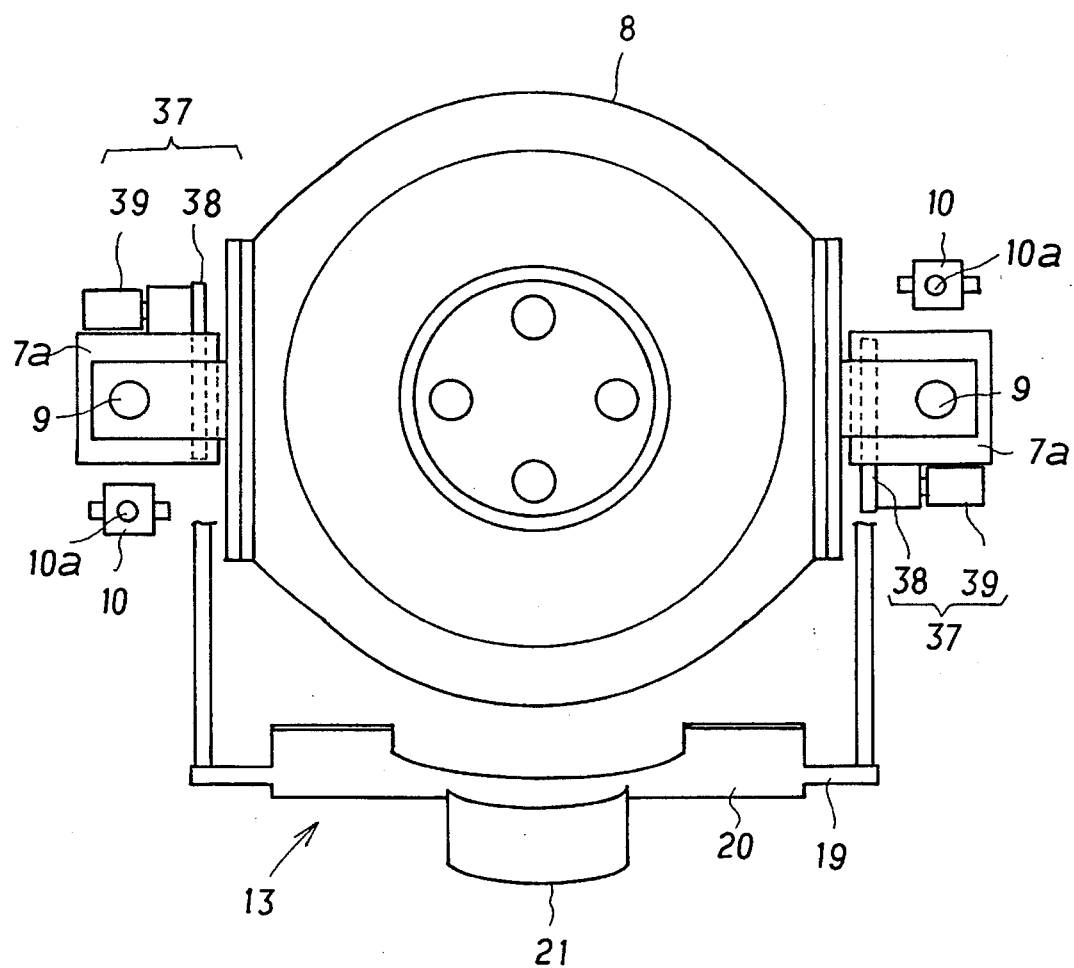
FIG. 2 is a plan view of said device.
Figure 3:
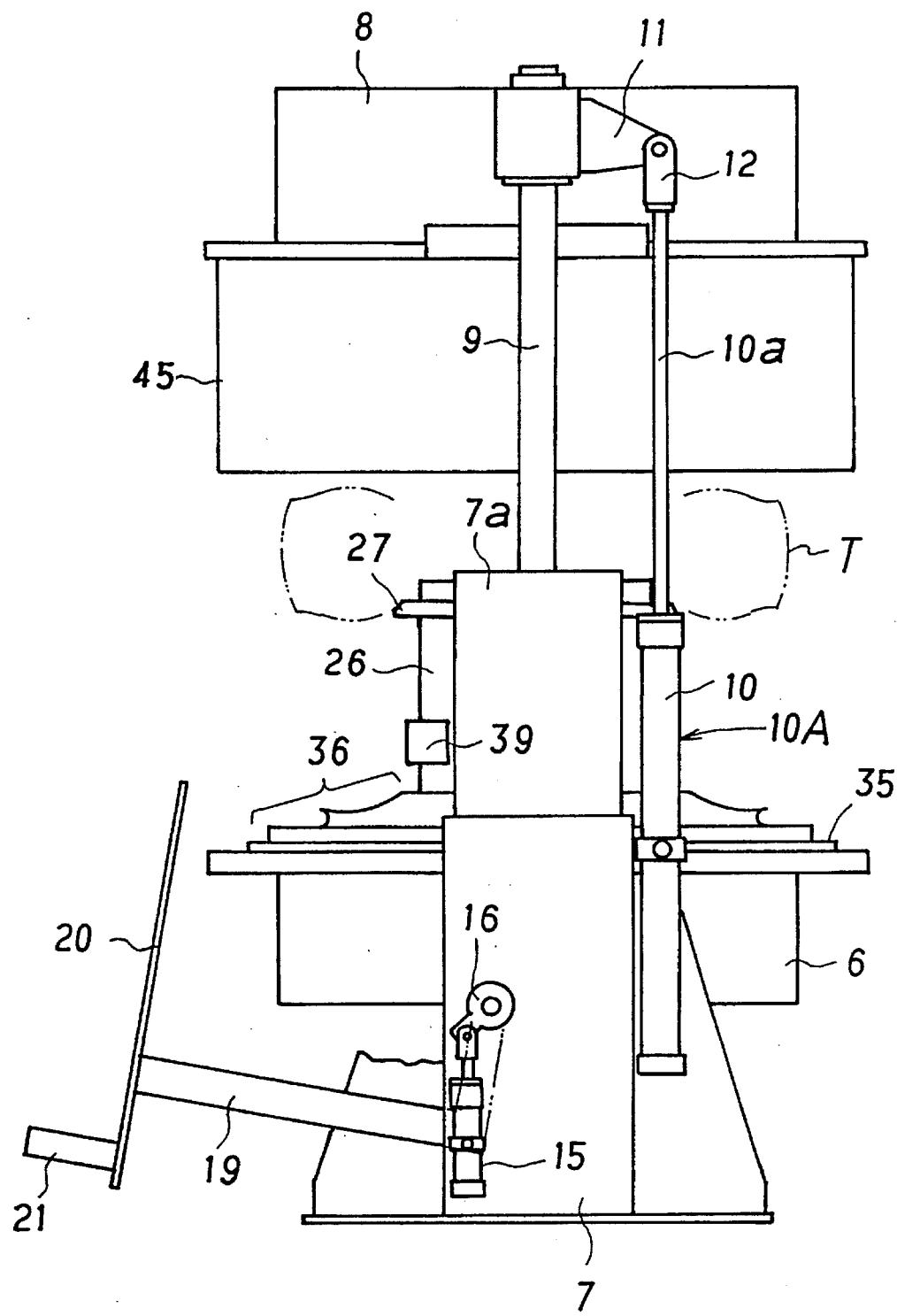
FIG. 3 is a side elevational view of said device.

An embodiment of the present invention is now explained in FIGS. 1–10. First, a device for the present invention is explained.

In the accompanying drawings, reference number 6 shows a lower rack whose both sides are supported by a pair of side frames 7,7, and reference number 8 shows an upwardly and downwardly movable upper rack supported by means of upwardly and downwardly movable guide shafts 9, 9 supported by guide bearings 7a, 7a fixed to side frames 7, 7 respectively. A rack closing device 10A for driving the upper rack 8 in upward and downward directions comprises hydraulic closing cylinders 10, 10 supported by the side frames 7, 7 respectively, and piston rods 10a, 10a whose tip ends are combined with the upper rack 8 by means of bracket members 11 and Y-shaped members 12.

Figure 7:
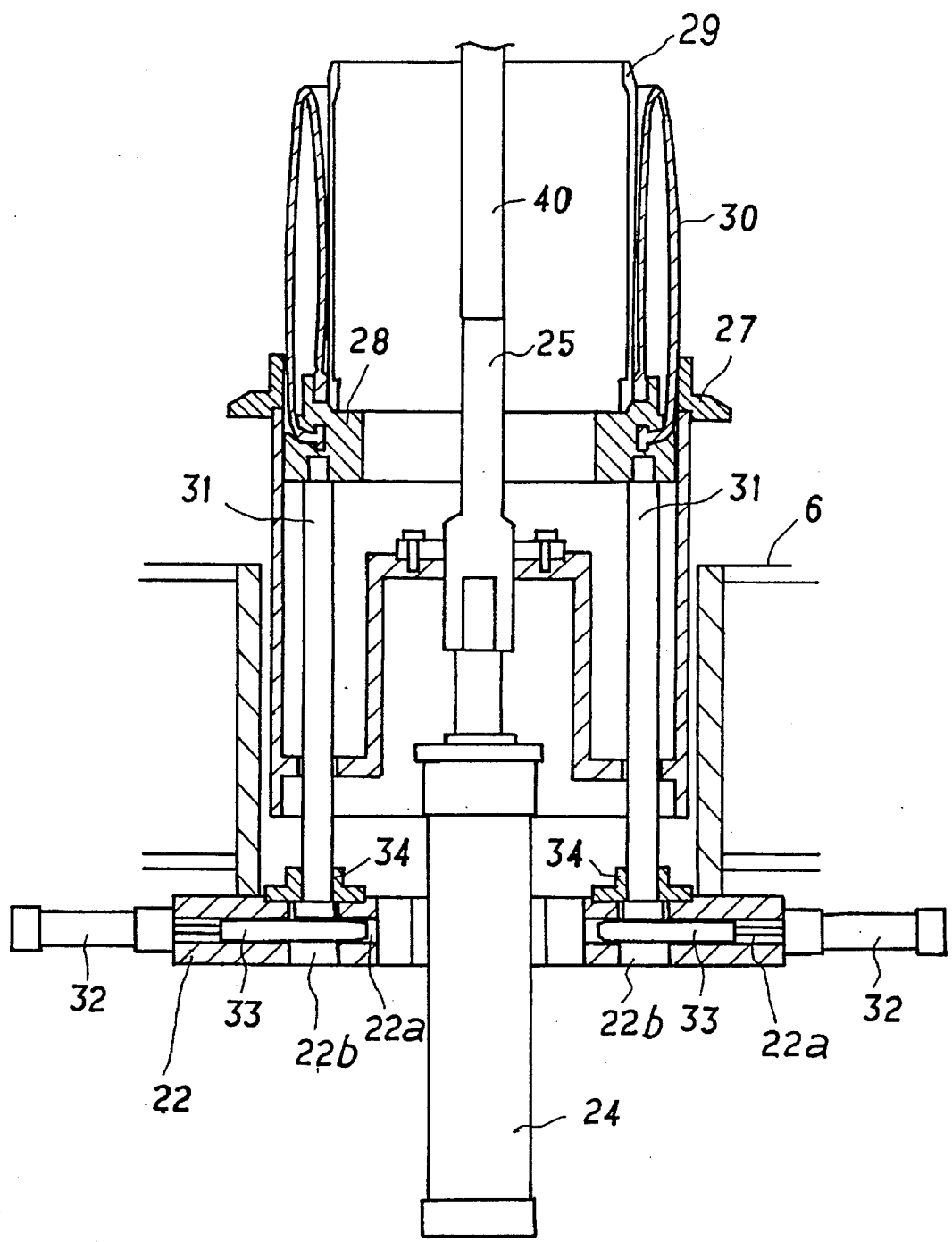
FIG. 7 is a side elevational sectional view to show a under-operating condition of said lower ring device.
Figure 9:
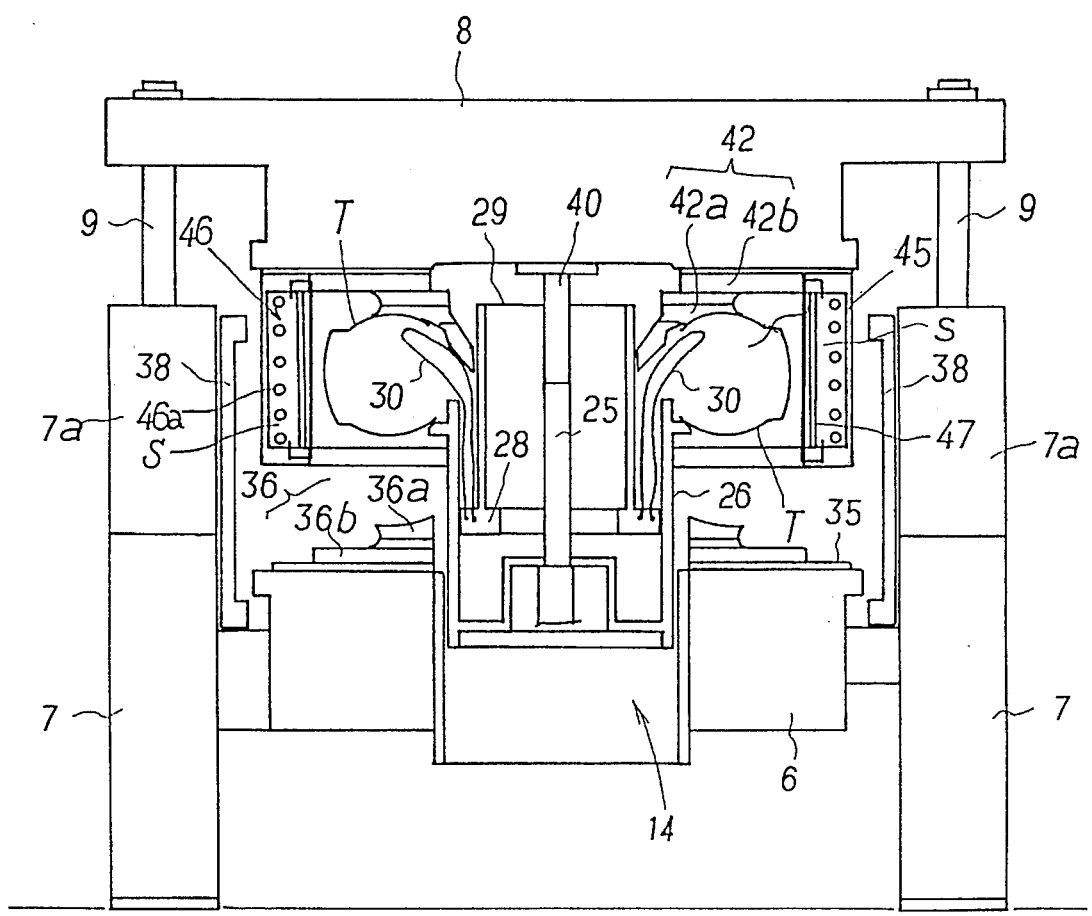
FIG. 9 is a partial sectional view to show a under-operating condition of said device.

Reference number 13 shows a tire loader device connected to the lower rack 6, and reference number 14 shows a lower ring device provided on the lower rack 6. In this case, the tire loader device 13 comprises loader cylinders 15 . . . supported by the side frames 7, 7 respectively, arms 16 . . . combined and worked with piston rods of said loader cylinders 15, shafts 17 . . whose one end is fixed to said arm 16, a ]-shaped bearer arm 19 fixed between the side frames to turnably hold the shaft 17, a tire bearer 20 fixed to the arm 19, and a stop member 21 fixed to the bearer 20. The tire bearer 20 is rocked and displaced from a position shown in FIG. 3 to a position shown by imaginary lines in FIG. 4 by stretching motions of the loader cylinder 15. The lower ring device 11 comprises a lower ring cylinder 24 fixed to a cylinder mounting eye 22 by means of supporting members 23 said cylinder mounting eye 22 being connected with the lower rack 6, a cylindrical lower ring mounting bracket 26 fixed by means of a flange of a lower push rod 25 screwed to a tip end of a piston rod of the lower ring cylinder 24, a lower bead ring 27 fixed to a tip edge of the lower ring mounting bracket 26, a bladder mounting clamp ring 28 provided inside the bracket 26 to be upwardly and downwardly displaceable a cylindrical guide ring 29 fixed to the ring 28, a bladder (an inner pressure tube) 30 provided between circumferential walls of the ring 29 and the bracket 26 and fixed to the clamp ring 28, suitable numbers (two, for example) of guide rods 31, 31 vertically provided on a lower face of the clamp ring 28 by passing through a bottom plate of the bracket 26, a pair of bladder lock cylinders 32, 32 fixed to facing sides of the cylinder mounting eyes 22, bladder rock pins 33, 33 provided in holes 22a, 22a formed in thick parts of the mounting eyes 22 and fixed to tip ends of piston rods of the cylinders 32, 32, and guide rod bearings 34, 34 fixed to a pair of vertical holes 22b, 22b formed in the mounting eye 22 to intersect with the holes 22a, 22a respectively. The lower ring device 14 is displaced from a position shown in FIG. 5 to that in FIG. 6 by stretching motions of the lower ring cylinder 24. When the guide rods 31, 31 are locked by stretching motions of the bladder lock cylinders 32, 32, as shown in FIG. 7, and then downward pressing pressure is given to the lower push rod 25, the lower ring mounting bracket 26 is displaced downward without positional changes of the clamp ring 28, the bladder 30 and the guide ring 29. Furthermore, when the lower ring cylinder 24 shown in FIG. 5 is stretched again to the position shown in FIG. 6, and then the guide rods 31, 31 are unlocked by retracting motions of the bladder lock cylinders 32, 32, and then the lower ring cylinder 24 is retracted, the clamp ring 28, the bladder 30, the guide ring 29, and the lower ring mounting bracket 26 are displaced downward together and return to the position shown in FIG. 5.

Reference number 35 is a circular adiabatic board fixed to an upper surface of the lower rack, and reference number 36 is a form member fixed thereon, which consists of a side plate 36a and a sub plate 36b. Reference numbers 37, 37 are a pair of rack clamp devices provided in both sides of the lower rack 6, which consist of ]-shaped clampers 38, 38 and press lock cylinders 39, 39 fixed to the side frames 7, 7 to move said clampers in right and left directions in FIG. 1.

Reference number 40 is an upper push rod fixed to a lower face of the upper rack 8, and provided right above the above-mentioned lower push rod 25. The upper push rod 40 forms an upper ring device with a later mentioned upper bead ring. Reference number 41 is a circular adiabatic board fixed to the lower face of the upper rack, and reference number 42 is a form member fixed thereunder, which consists of a side plate 42a and a sub plate 42b. Reference number 43 is an upper bead ring fixed to a lower edge of the form plate.

Reference number 44 is a heating furnace device, which forms a heating furnace with the above mentioned form plate. The heating furnace device 44 consists of a cylindrical jacket 45 for covering a circumference of the tire, a heating device 46 provided along an inner circumferential face of said jacket 45, and an envelope 48 of a rubber sleeve fixed inside said heating device 46 by means of a cage 47. In this case, ribs 45a, 45b are provided on upper and lower parts of the jacket 45 to fit the cage 47 therein, as shown in FIG. 8(e) and (f). The heating device 46 is an electric far infrared heater, wherein loop electric heat tubes 46a . . . are provided at many stages, though it is not restricted to this means. The cage 47, as shown in FIG. 8(a), is formed by connecting a number of bars 47c with two rings 47a, 47b, and rubber liners 47d, 47d made of hard rubber are fixed to an outer face of each ring 47a, 47b. The envelope 48, as shown in FIG. 8(b), is a simple cylinder made of elastic and extensible material (including an equal to rubber). Reference number 49, as shown in FIG. 8(c) and (f), is a liner ring for pushing the envelope 48 and prohibiting the cage 47 from getting out. Said liner ring 49 is circular, and provided with projections 49a to be inserted between an outer circumferential face of the ring 47a of the cage 47 and an inner circumferential face of the rib 45b. It is bolted to an upper surface of the rib 45b.

In fixing the above mentioned envelope 48, first the envelope 48 is inserted in the cage 47, as shown in FIG. 8(c). Next, both edges of the envelope 48 are folded to the outside, as shown in FIG. 8(d). Then, it is inserted in the jacket 45, as shown in FIG. 8(e), and the liner ring 49 is bolted thereto, as shown in FIG. 8(f). By this, a lower edge of the envelope 48 is pressed by the rib 45a of the jacket 45 to be sealed, while upper edge thereof is pressed by the liner ring 49 to be seated as well. Accordingly, an annular sealed up space S is formed in the outer circumferential side of the envelope 48. Fluid pressure of compressed air, etc. is ventilated to the sealed up space S through a suitable path 45c.

Next, working processes in producing a precured retreaded tire by the above mentioned device are explained.

Figure 4A:
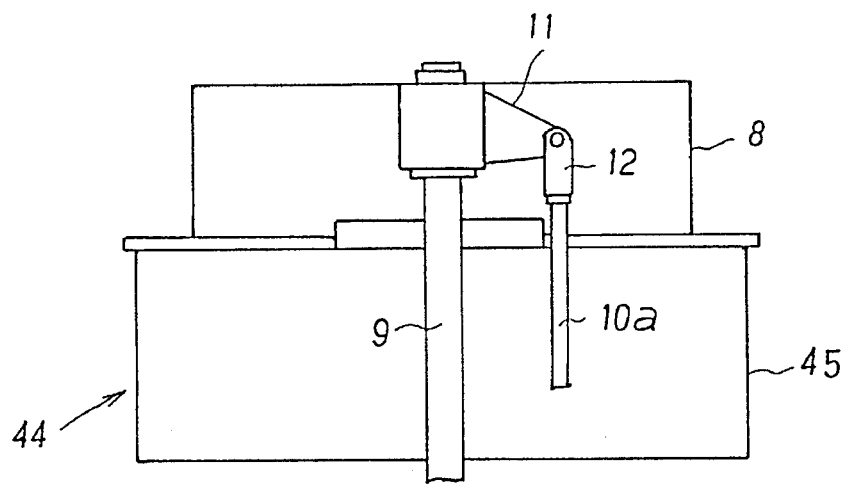
FIG. 4 is a side elevational explanatory view of said device.
Figure 4B:
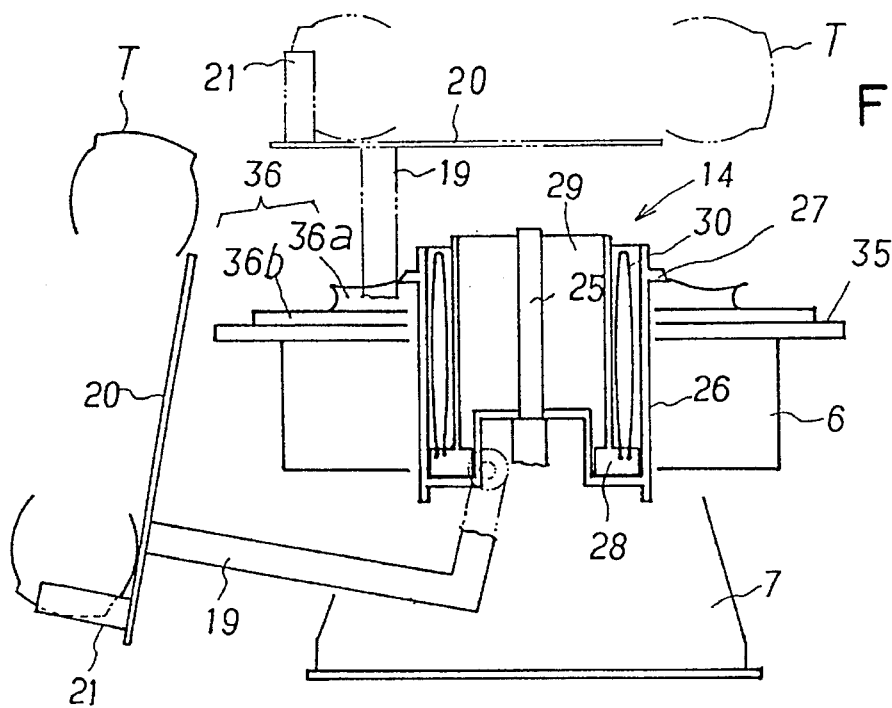
Figure 5:
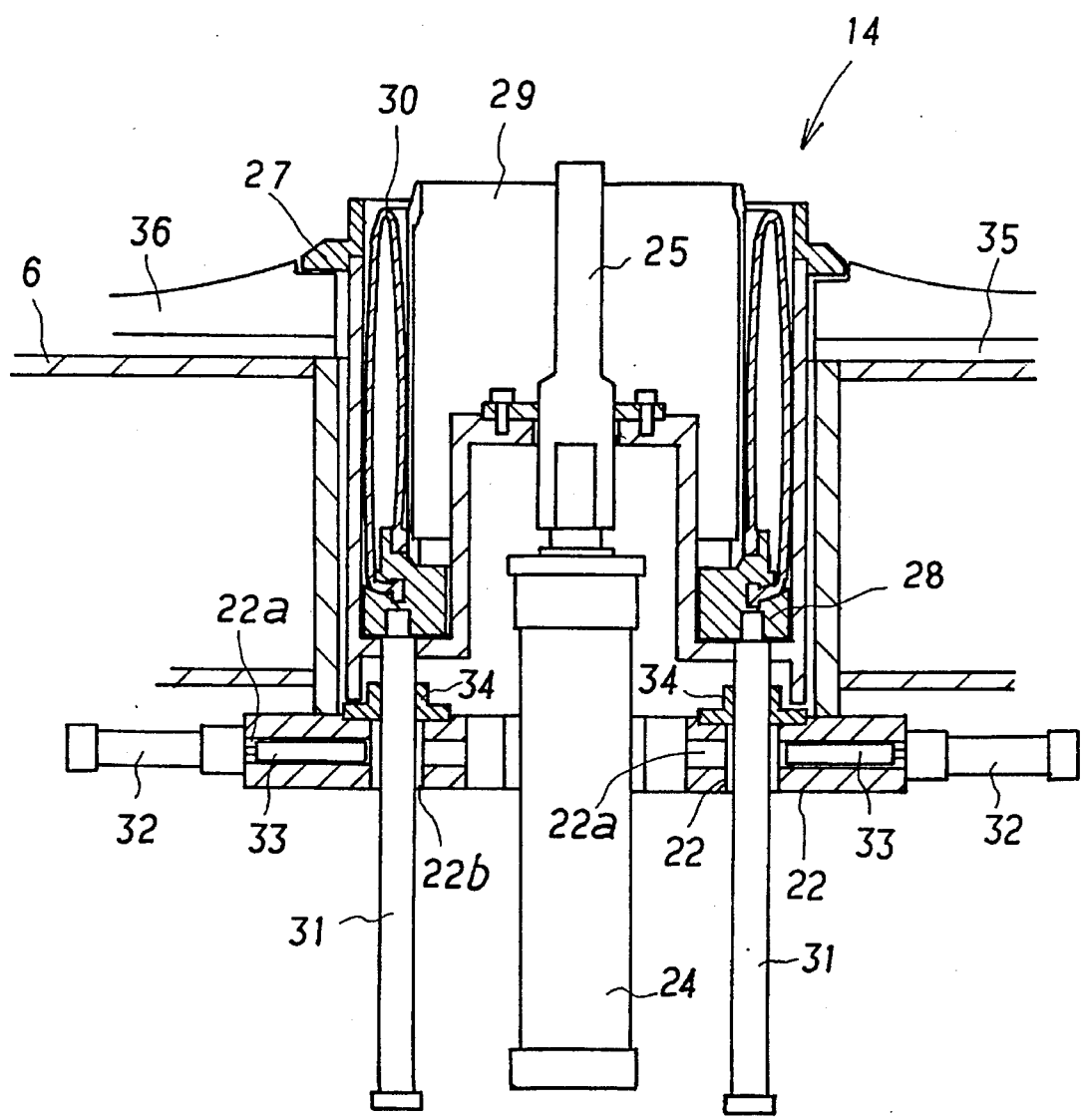
FIG. 5 is a side elevational sectional view to show a pre-operating condition of a lower ring device of said device.
Figure 6:
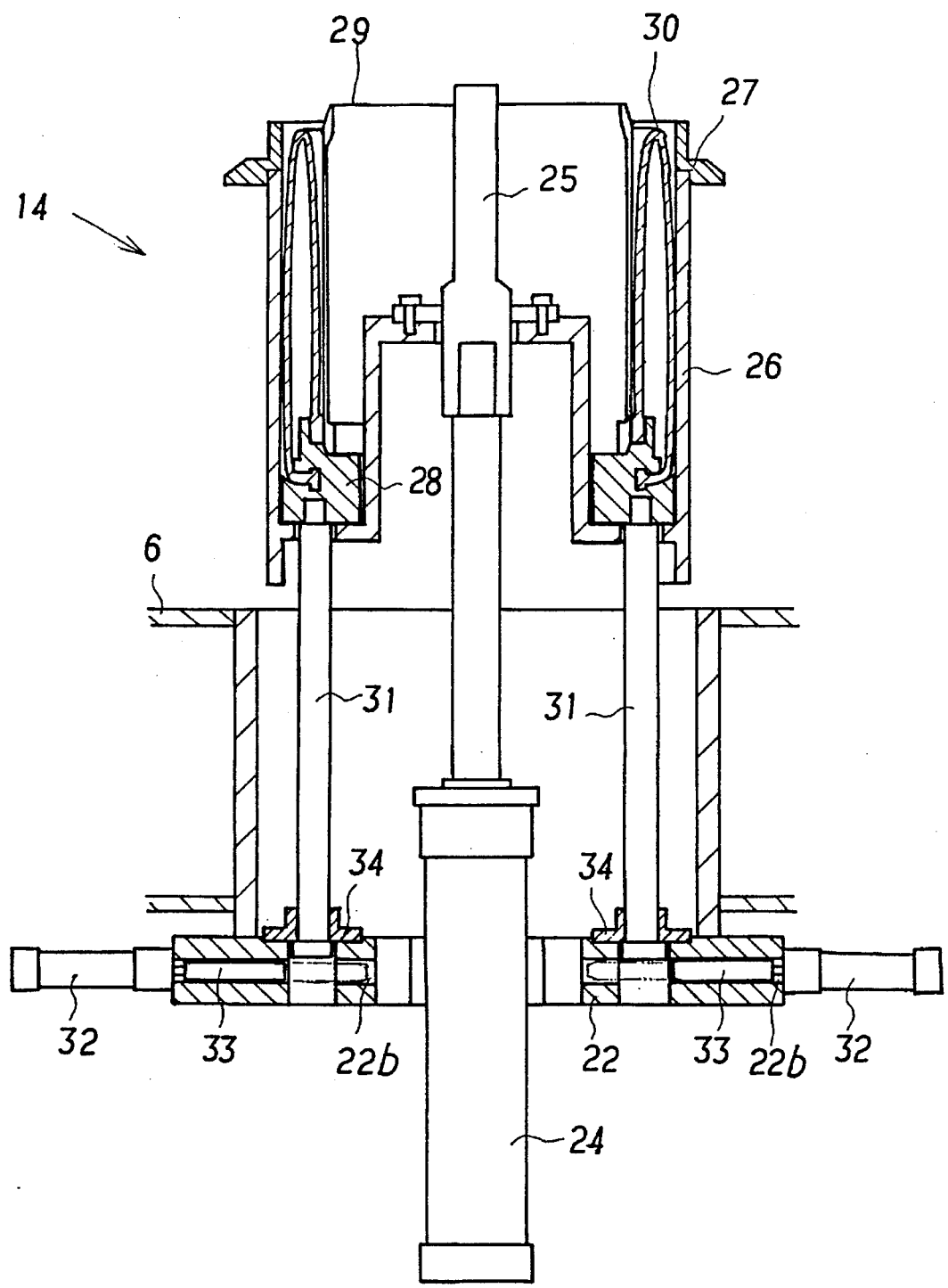
FIG. 6 is a side elevational sectional view to show a under-operating condition of said lower ring device.
Figure 10:
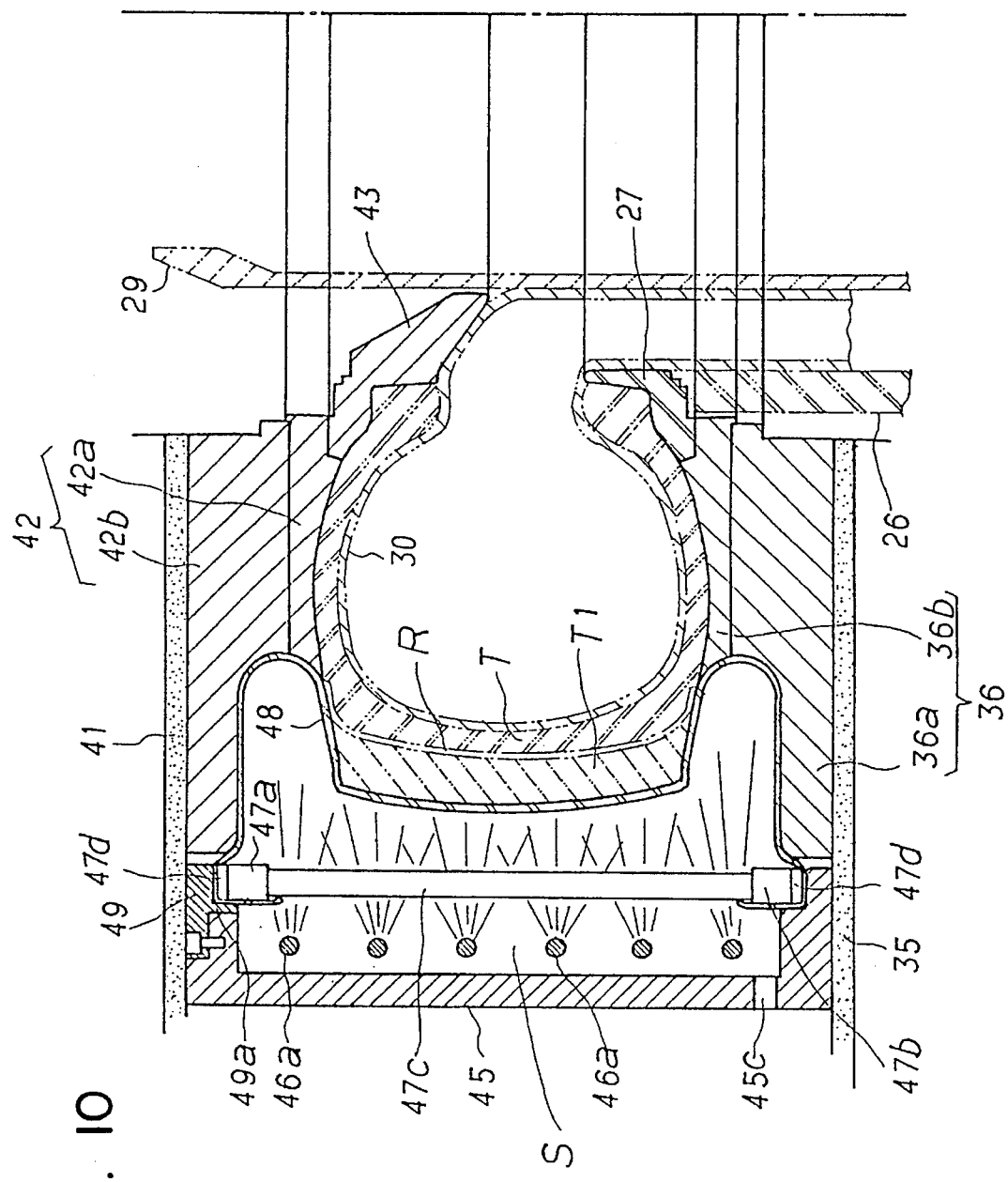
FIG. 10 is a partial sectional view to show a under-operating condition of the heating device of said device.
Figure 11:
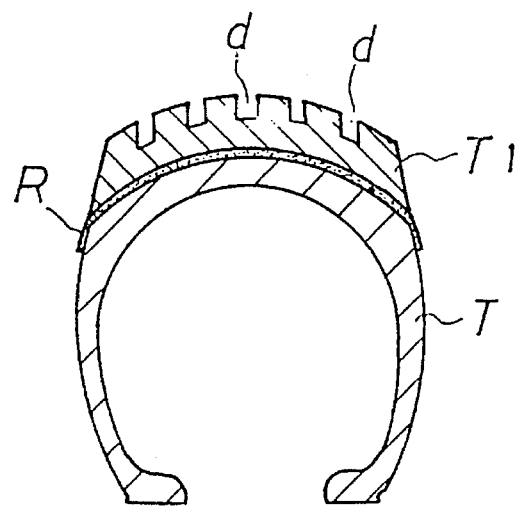
FIG. 11 is a sectional view of a tire to be processed.
Figure 12:
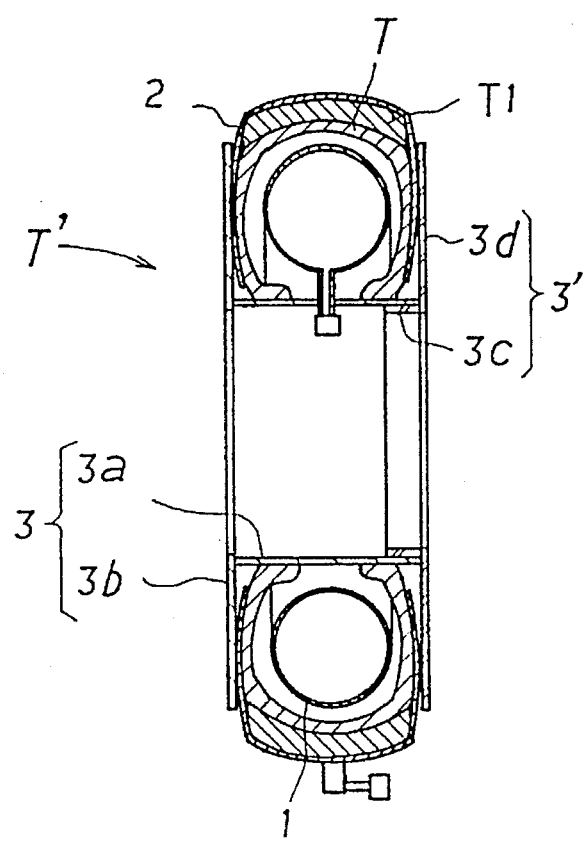
FIG. 12 is a sectional view of a conventional set of tire.
Figure 13:
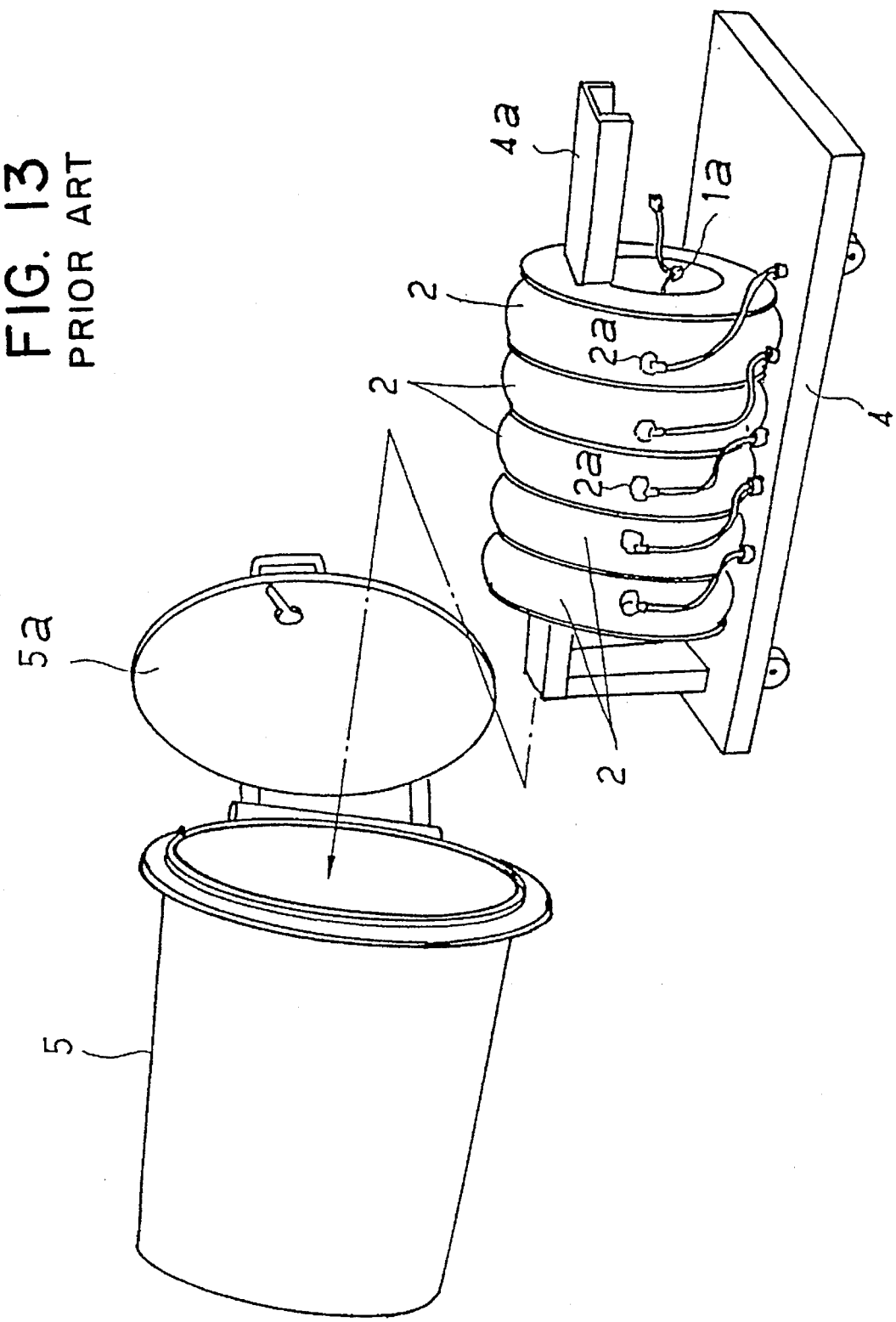
FIG. 13 shows a conventional example.

First process is to insert a bladder 30 in a buffed tire T mechanically and give inner pressure therein with fluid pressure. Specifically, a tire T shown in FIG. 11 is put on a tire bearing 20, as shown by solid lines in FIG. 4. In this case, a tire T may be manually set or automatically set by a suitable feeding device. Next, a loader cylinder 15 is automatically or manually stretched. By this operation, a tire loader device 13 displaces a tire T with the tire bearing 20 to the position shown by imaginary lines in FIG. 4. In conjunction with the displacement, a lower ring cylinder 24 begins to be stretched, and a lower ring device 14 shown in FIG. 5 is displaced to the position shown in FIG. 6. Accordingly, a lower bead ring 27 is fitted to a lower bead of the tire T so as to support the tire T. Then, a lower ring mounting bracket 26 is raised so as to lift the tire T above the tire bearing 20. On the other hand, in conjunction with this, the loader cylinder 15 is now retracted, and the tire bearing 20 returns to the original position shown by solid lines in FIG. 4. When the lower ring cylinder 2F is raised to the highest position, the bladder lock cylinders 32, 32 are stretched, and the bladder lock pins 33, 33 are displaced to the position shown by imaginary lines in FIG. 6 so as to prevent guide rods 31, 31 from moving downward. Afterward, closing cylinders 10, 10 automatically begin to be retracted, and a rack closing device 10A lowers an upper rack 8. Accordingly, an upper bead ring 43 fits to an upper bead of the tire T, and pushes it moderately. On the other hand, as shown in FIG. 7, an upper push rod 40 abuts on a lower push rod 25, and pushes it down, thereby lowering the lower ring mounting bracket 26 connected with said lower push rod 25. In the process of lowering the lower ring mounting bracket 26, the tire T is held between the lower bead ring 27 and the upper bead ring 43, and lowered with these rings 27 and 43. On the other hand, as the lower ring mounting bracket 26 is lowered, the bladder 30 is gradually exposed and inserted into the tire T along an inclined outer surface of the upper bead ring 43. During this, working fluid in the lower ring cylinder 24 is discharged through a suitable pressure releasing valve by the pushing pressure of the upper path rod 40. When the lower ring mounting bracket 26 is lowered to the original position shown in FIG. 5, the bladder 30 is completely inserted into the tire T. On the other hand, in conjunction with this, press lock cylinders 39, 39 are streched, and clampers 38, 38 fit both sides of the upper rack 8 and the lower rack 6, thereby restricting their relative position. Then, pressure fluid such as air (about 10 kg/cm² at most) is fed into the bladder 30 from the outside through a suitable path, thereby supplying inner pressure to an inner face of the tire T, as shown in FIG. 10. In this case, an outer side face of the tire T is supported by form plates 36 and 42, and closely connected with surfaces thereof by the inner pressure of the bladder 30.

The next process is to automatically attach an envelope 48 to the outer surface of the tire T by fluid pressure. The specific process is as follows. When the inner pressure is given to the tire T in the previous process as shown in FIG. 10, in conjunction with this, pressure fluid such as air (about 8 kg/cm² at most) is now automatically supplied to the sealed up space S in the outer circumferential side of the envelope 48 through a suitable path 45c. In this case, pressure of the pressure fluid is set smaller than that of the bladder 30. By this, the envelope 48 is elastically transformed and pressed to the outer surface of the tire T and the surfaces of the form members 36, 42 to cover them. Accordingly, a plate rubber T1 and a linking rubber R are firmly and closely connected to a buffed face of the tire T. In the process of expanding the envelope 48, air left among the envelope 48, the form members 36, 42, and the tire T is discharged through releasing holes which are suitably provided on the form members 36, 42.

The last process is to vulcanize the linking rubber R by a heating device 46, and to integrally combine the once vulcanized plate rubber T1 to the outer surface of the tire T. Specifically, when the envelope 48 adheres to the tire T, it is detected by detecting the pressure in the sealed up space S. In conjunction with this detection, electricity is supplied to a far infrared heater of the heating device 46, and far infrared rays are radiated toward the tire T. By the great penetrating effects of the far infrared rays, the linking rubber R is uniformly and effectively heated. In this case, a heating temperature of the heating device 46 is so set that the linking rubber R becomes at about 100° C. The heating is carried out for several hours.

When each of the above-mentioned processes is over, the pressure fluid in the sealed up space S and the bladder 30 is automatically blown. On the other hand, the press lock cylinders 39, 39 are retracted so that the clampers 38, 38 release the positional restriction of the upper rack 8 and the lower rack 6. After the closing cylinders 10, 10 are stretched so as to raise the upper rack 8 to the original position, the lower ring cylinders 24 is stretched again so as to displace the lower ring mounting bracket 26 to the position shown in FIG. 6. In conjunction with this, the loader cylinders 15 . . . are stretched, and the empty tire bearing 20 is displaced again to the position shown by imaginary lines in FIG. 4. Then, the bladder lock cylinders 32, 32 are retracted so as to retreated the bladder lock pins 33, 33 to the original position. Then, the lower ring cylinder 24 is retracted so that the lower ring mounting bracket 26 and the bladder mounting clamp ring 28 are integrally lowered to the original position shown in FIG. 5. During this lowering process, a processed tire T is supported by the waiting tire bearing 20, being placed thereon. The tire bearing 20 supporting the tire T returns to the original position by the loader cylinders 15 . . . which are retracted in conjunction with the retraction of the lower ring cylinder 24, and then the tire T is taken out, as shown in FIG. 4.

In the above-mentioned embodiment, heating of the heating device 46 is carried out by a far infrared heater from only the outer peripheral face of the tire T. However, it is also possible to heat the tire from side faces thereof, or to heat the tire indirectly by using steam. Though they are not illustrated, suitable reflecting mirrors are provided outside the far infrared heater to use heat waves effectively. It is preferable to preliminarily supply a small amount of pressure fluid to the bladder 30 to expand it slightly and to keep it in a required form, before starting the real supply of the fluid. Besides, in order to deal with tires of different sizes, some form members 36, 42, upper bead rings 43, and lower bead rings 27 of different sizes are prepared.

I claim:
1. An apparatus for producing a precured retreaded tire from a buffered tire, a plate of vulcanized rubber juxtaposed with a circumferential face of the buffered tire, and a member of unvulcanized linking rubber placed between the belt and the buffed tire comprising:

a tire loader device for continuously providing a buffed tire;

a lower ring device for receiving thereon the buffed tire from said tire loader device;

a lower rack having form members which contact a lower side face of the buffed tire;

an upper rack having an upper ring device for pushing the buffed tire placed on said lower ring device and form members for contacting an upper side of the buffed tire; and a heating furnace device movable in upward and downward directions for covering the outside of the buffed tire, said heating furnace device including a jacket for covering a circumference of the buffed tire, a heating device on an inner circumferential side of the jacket, and an envelope made of a deformable rubber sleeve inside the heating device, wherein the lower ring device has a bladder insertable into the buffed tire by a related operation of the lower and upper ring devices, the envelope is engageable with the plate of vulcanized rubber by the use of fluid pressure, and the unvulanized linking rubber for the tire is vulcanizable by the heating device.

2. An apparatus for producing a precured retreaded tire according to claim 1, wherein the heating device is a far infrared heater positioned along the inner circumferential face of the jacket.

* * * * *